July 31, 1934.   C. W. VOGT   1,968,183
MULTILAYER FROZEN COMESTIBLE PRODUCT
Filed Sept. 19, 1931
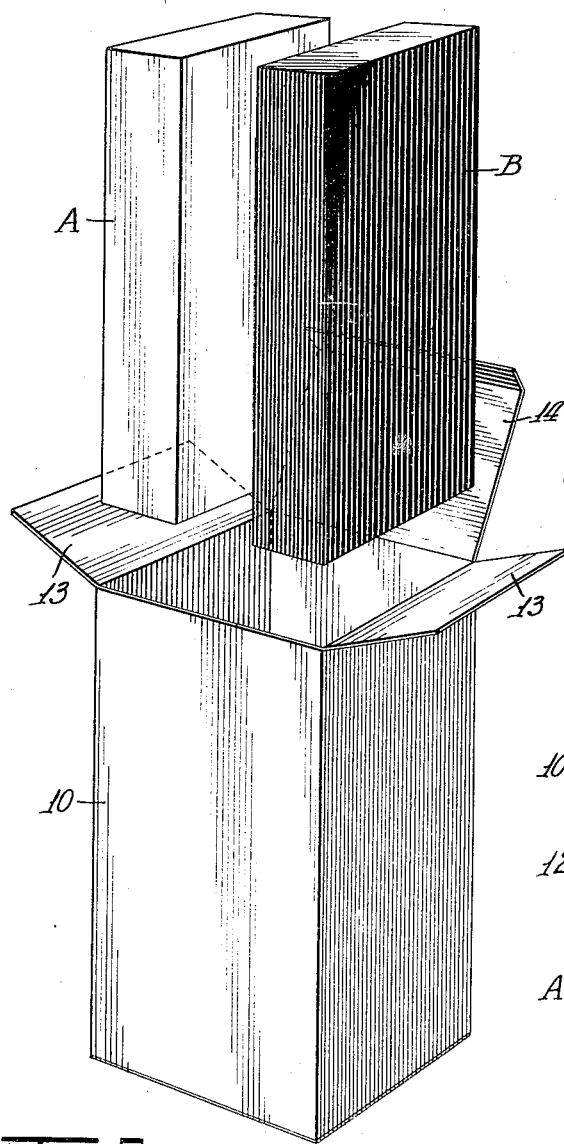
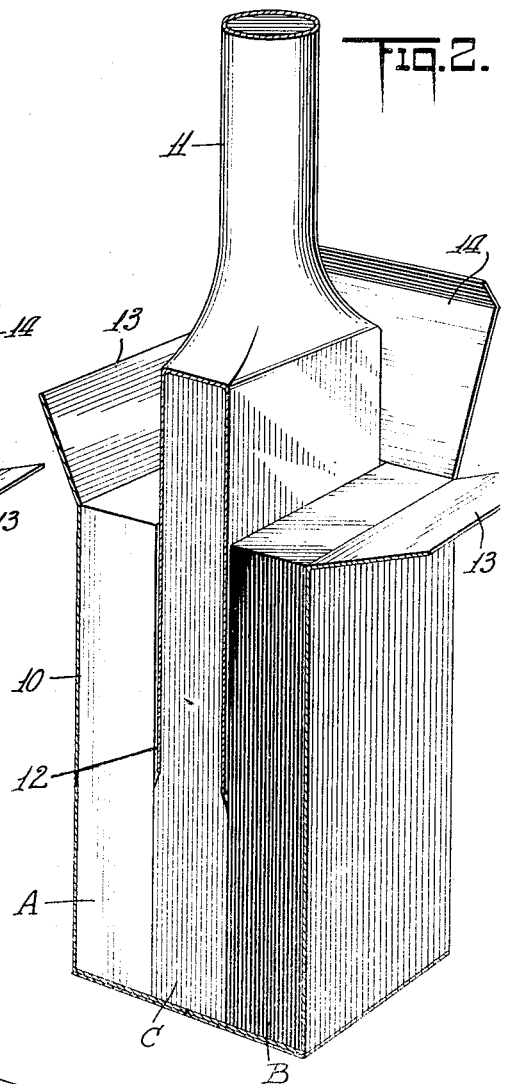
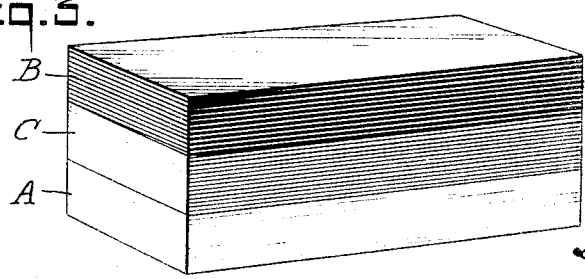
INVENTOR
Clarence W. Vogt.
BY
Dean Fairbank Hirsch Foster
ATTORNEYS Patented July 31, 1934

1,968,183

UNITED STATES PATENT OFFICE 1,968,183

MULTILAYER FROZEN COMESTIBLE PRODUCT

Clarence W. Vogt, Louisville, Ky., assignor, by mesne assignments, to Vogt Processes, Incorporated, Louisville, Ky., a corporation of Delaware Application September 19, 1931, Serial No. 563,804

2 Claims. (Cl. 62—174)

This invention relates particularly to the manufacture of bricks of ice cream or other comestible which is liquid at body temperature, but may be employed in connection with other comestibles which may be made up of layers, and which are shipped, stored or served in frozen condition.

In the manufacture of ice cream bricks, the portions of ice cream of different flavor or composition are usually brought together in a mold, while the ice cream is in a comparatively soft and plastic condition. Considerable time is required for the further freezing and desired hardening of the soft, plastic brick, due to the slow rate of heat transfer through the material. The softness or plasticity of the ingredients of the several layers makes it difficult if not impossible to make the layers of uniform thickness with any sharp line of division between the separate layers, for instance, between chocolate and vanilla or between vanilla and strawberry, when portions of ice cream of these flavors are injected into a carton simultaneously or successively. A distinct and uniform line of demarcation between the flavors is desirable to prevent intermixing of the flavors.

The main objects of my invention are to facilitate the assembly of the material in separate layers, increase the rapidity with which the layers may be assembled, and the final freezing or hardening effected, simplify the final and uniform hardening, insure a more uniform thickness of the several layers, and produce a sharper line of demarcation between the layers.

In carrying out my invention, I separately freeze and harden one or more of the layers. Another layer in comparatively soft or plastic condition is brought into the proper position in respect to the first mentioned layer or layers, and the further freezing or hardening is then effected. The first mentioned hardened layer or layers may advantageously be superchilled or superhardened to a low temperature, and thus rendered capable of absorbing a sufficient amount of sensible as well as latent heat from the second mentioned and softer layer or layers, so that the latter are effectively hardened solely by the absorption of heat by the first frozen layers. Due to the extremely low temperature of the layers which are first frozen, there will be little or no intermixing therewith of the relatively warmer and softer cream forming the second layers, except to create a bond therebetween. The first frozen and hardened layers may be of definite and predetermined thickness, and these may be spaced a definite distance apart to leave a chamber into which the softer cream is delivered, and in which it is frozen to form another layer of definite and predetermined thickness.

In carrying out the invention, no special form of apparatus is required although in the accompanying drawing I have illustrated certain parts which may be used in carrying out my process.
In the drawing:

Fig. 1 is a perspective view of a container or mold with two hardened layers about to be introduced therein.

Fig. 2 is a longitudinal section of the container with two frozen and hardened layers therein, and a nozzle delivering the softer material to form the third or intermediate layer, and Fig. 3 is a perspective view of the complete brick removed from the container or mold.

As one embodiment of the process, there are prepared two blocks of superchilled and hardened ice cream, each of which may be only a fraction of the thickness of the desired complete brick. These separate layers may be formed in any suitable form of apparatus or by any desired process.

Merely as an example, I may employ the apparatus and process disclosed and claimed in my prior Patents 1,810,740, 1,810,863 and 1,810,864, granted June 16, 1931. Such apparatus or other suitable apparatus may be so proportioned as to form blocks, each of which may have a volume corresponding to aproximately one-third of that of a desired ice cream brick. If it is desired to manufacture bricks of one-quart size, I may provide a mold or a container or carton 10 of such size as will receive one quart of ice cream, and may make the blocks A and B each of a length and width substantially equal to that of the carton, but of a thickness equal to approximately one-third the thickness of the carton. Two such blocks after being frozen or hardened to the required degree, and preferably superchilled to very low temperature, may have the paper removed from at least one side, and may be inserted in the carton against opposite walls, so as to leave a space therebetween. These two blocks A and B may be of the same flavor or composition, or if desired, may be of different flavors and composition.

After inserting the two blocks in the carton, the space therebetween is filled with a soft and plastic but partially frozen ice cream to form a middle layer C, and this is hardened in place between the two blocks A and B which form the other two layers. Although various types of apparatus may be employed for inserting the soft ice cream between the two side layers, I preferably deliver the cream partially frozen and comparatively stiff from a continuous freezer such as is shown in my prior Patents 1,783,864, 1,783,865, 1,783,866 and 1,783,867, dated December 2, 1930. The delivery conduit 11 leading from such a freezer or from any other source of partially frozen ice cream under pressure, may be provided with a head or nozzle 12 opened at the bottom, and of a size, particularly at its lower end, adapted to substantially but not completely fill the space between the two blocks A and B in the container 10. The head or nozzle 12 may be vertically movable to permit it to be inserted to the bottom of the container, or it may be stationary, and the container may be slipped up on to the end of the nozzle to bring the end of the latter to the bottom of the container.

As the material is delivered through the conduit 11, the nozzle and container are slowly separated until the space is entirely filled and the nozzle is then brought to the bottom of another container. When each container has the middle space therein completely filled, the container may be closed, for instance by the use of flaps 13, 13 and 14. The cream forming the middle layer is preferably of a different flavor or composition from that of either of the side layers.

The middle layer may be finally hardened partly by the chilling effect of the colder and harder side layers, and partly by exteriorly applied refrigerant, as for instance the cold air, in a hardening room, or the hardening may be effected entirely by the withdrawal of heat therefrom by the supercooled side layers. For instance, if the side layers be at a temperature of approximately −10° F., and the material forming the middle layer be delivered at a temperature of +20° F., the final brick may come to a temperature of 0°F. to +5° F. and all three layers will be of substantially the same hardness and frozen to substantially the same extent. At first, the surfaces of the side layers may soften sufficiently to form an effective bond, but these will again harden as the temperature equalizes.

Although in the foregoing description of one embodiment of the invention, I have described the making of a brick having three layers, it will, of course, be obvious that the invention may be carried out with only a single prefrozen and hardened layer, with two layers of the softer ice cream applied upon opposite sides thereof, or with a single layer applied to only one side, or the blocks of prehardened ice cream may be thinner and a larger number of the softer layers inserted to make a brick having more than three layers.

The soft ice cream which is delivered to make one or more layers may be sufficiently soft, so that when delivered it will completely fill the available space without visible air voids even though poured in from the top, but preferably this softer ice cream is delivered frozen to a plastic state and to such an extent that it does not flow freely. Thus if delivered at the top, it might leave air voids, and should be delivered to the bottom of the available space, and such space filled from the bottom up, so as to prevent the formation of visible air voids. With the ice cream in this plastic condition, I prevent any melting of the prefrozen layers in the carton or other mold to any substantial extent. Of course, a slight softening of the surface portion of the prefrozen layers is desirable as it causes the several layers to firmly adhere, but does not effect any considerable intermingling of the constituents or the flavors of the separate layers.

For the production of multi-layer bricks, such as are now sold to the trade, the thickness of each of the three layers is approximately ¾". With a −20° F. brine available and with a double contact apparatus as shown, for instance, in my above mentioned patents issued June 16, 1931, slabs of ice cream approximately ¾" thick can be hardened to a temperature of approximately −10° F. in six minutes. Whereas, with the same temperature of brine and in the same equipment, slabs of ice cream 2¼" thick (which is approximately the thickness of the present pint or quart cartons) require an hour to reach a temperature of 0° F. at the center.

While I have illustrated the method as applying to multi-flavored bricks, it will be obvious that a brick of one flavor can be thus produced by the insertion between two prehardened slabs of any flavor, of a slab composed of partially frozen ice cream of the same flavor.

Having thus described my invention, what I claim as new and desire to secure by Letters Patent is:—

1. The method of preparing and packaging a multilayer frozen comestible, which includes placing in a container a pair of spaced superhard prefrozen layers of said comestible, delivering between said blocks a layer of a softer comestible frozen to a less extent, and hardening the second mentioned layer by heat transfer within said container during the equalization of the temperature of the separate layers the temperature of the first mentioned layers being sufficiently low to effect such hardening.

2. The method of preparing a frozen comestible of substantially uniform temperature throughout, which includes positioning separate bodies of hard superfrozen comestible with a space therebetween, and bonding said bodies together to form a unitary mass by filling said space with a soft comestible of a flowable consistency and acting to first partially soften the surface portions of said bodies, and said bodies then acting to further freeze and harden said filling and bonding mass by absorption of heat therefrom.

CLARENCE W. VOGT.